Patented Apr. 6, 1948

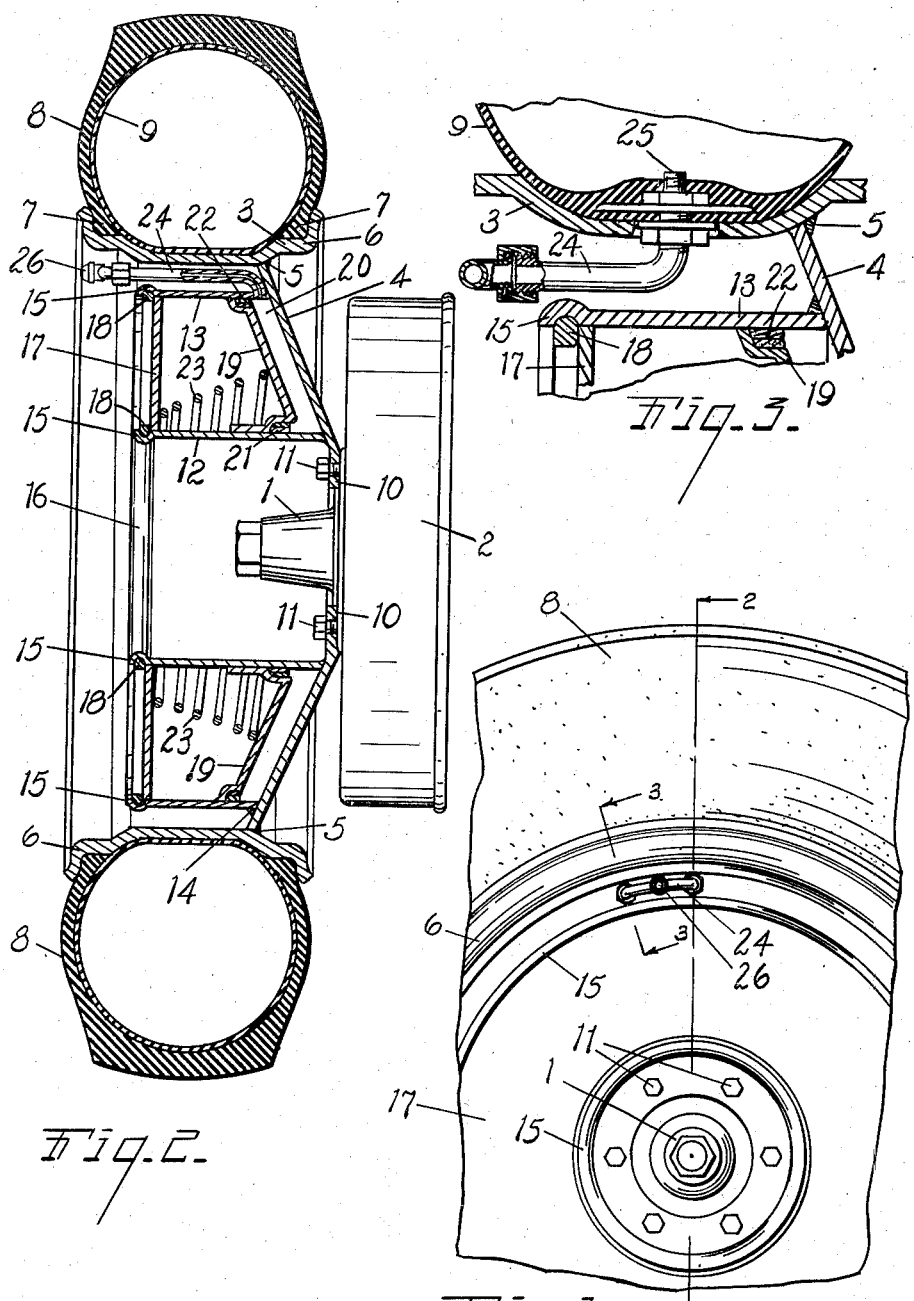

2,439,188

UNITED STATES PATENT OFFICE 2,439,188

TIRE PRESSURE STABILIZER

Edwin R. Sage, Los Angeles, Calif.

Application March 14, 1946, Serial No. 654,257

6 Claims. (Cl. 152—418)

This invention relates to improvements in tire pressure stabilizers.

The main objects of this invention are:

First, to provide a tire pressure stabilizer or means for maintaining substantially uniform pressure within a tire under varying operating conditions such as temperature variations, load conditions, and the like.

Second, to provide a structure of this character which may be readily embodied in wheels without materially varying the design thereof.

Third, to provide a structure having these advantages which is comparatively economical and durable in its parts.

Objects relating to details and economies of the invention will appear from the description to follow. The invention is defined and pointed out in the claims.

A preferred embodiment of the invention is illustrated in the accompanying drawing, in which:

Fig. 1 is a fragmentary front or outer side elevation of a pneumatic wheel structure embodying the invention.

Fig. 2 is an enlarged view mainly in section on a line corresponding to line 2—2 of Fig. 1.

Fig. 3 is an enlarged fragmentary view in section on line 3—3 of Fig. 1.

It is commonly recognized that the life of pneumatic tires, particularly on trucks, is or may be greatly reduced by the stresses to which the tires are subjected particularly in hot weather resulting from the tire becoming heated and the expansion of air within the tire. This frequently results in blow-outs on weakened or damaged tires which would otherwise be capable of use for considerable additional mileage. Such blow-outs frequently results in accidents and my invention minimizes the stresses to which the tire is subjected under such operating conditions and greatly prolongs the life thereof and lessens the danger of accidents and delays such as result from blow-outs.

In the accompanying drawing, 1 represents the hub of a motor vehicle and 2 the brake housing associated therewith. My improved wheel comprises the rim 3 which is supported by the dished web 4 welded to the rim at 5 adjacent the inner edge of the rim. The rim is of conventional type and has flanges 6 adapted to engage the beads 7 of the tire casing 8. The pneumatic or inner tube is indicated at 9. These rim and tire parts are of conventional type.

The web 4 has inner flange portions 10 receiving the screw bolts 11 by which the wheel is secured to the hub.

I provide a cylinder or expansion chamber comprising the inner and outer annular radially spaced side wall members 12 and 13 respectively, the inner ends of these members being welded throughout to the outer side of the web 4 as indicated at 14. The inner wall member 12 is of such diameter as to permit access to the hub and the attaching bolts or screws 11 from the outer side of the wheel.

The wall members 12 and 13 have inwardly facing channels 15 at their outer ends, these channels being the result of bead-like formations 16 which have the further advantage of stiffening the wall members.

The annular closure plate 17 fits between the concentric wall members 12 and 13 and is retained by the snap rings 18 engaged within the channels 15. The plunger 19 is slidable between the wall members 12 and 13 and is preferably inclined as shown in the drawing, the angle of inclination being substantially that of the web.

With the parts thus arranged, the web, the wall members, and the plunger provide an expansion chamber designated generally by the numeral 20. Packings 21 and 22 are provided for the plunger or movable wall member.

The coiled spring 23 is arranged between the plunger and the closure member, the spring being preferably helically coiled and cone-shaped with its larger end inwardly so that the inner coil engages the plunger at the approximate center thereof. The outer end of the spring is in thrust abutment engagement with the closure plate.

The conduit 24 is connected to the expansion chamber at the inner end thereof, the other end of the conduit being connected to the tire stem 25. A filler valve designated generally by the numeral 26 is provided.

It will be noted that the rim projects beyond the cylinder parts so that it serves as a guard therefor and that it also constitutes a guard or shield for the connections which are mainly disposed between the outer cylinder wall member 13 and the rim.

With the parts thus arranged, substantially constant pressure is maintained within the tire inasmuch as the spring 23 is of such tension as to yield or permit expansion of the expansion chamber when the pressure within the tire becomes excessive or exceeds a predetermined amount. For example, when the pressure rises within the tire due to operating on hot pavements, air can flow into the expansion chamber and when the pressure falls as a result of cooling of the tire the air can flow from the expansion chamber back into the tire and subject to the pressure of the spring for maintaining the desired pressure in the tire.

I have illustrated and described my invention in an embodiment thereof which I believe will enable those skilled in the art to embody or adapt the invention as may be desired. I have not attempted to illustrate or describe various modifications and adaptations as it is believed that this disclosure will enable those skilled in the art to embody or adapt my invention as may be desired—for example to particular wheel structures.

Having thus described my invention, what I claim as new and desire to secure by Letters Patent is:

1. A wheel comprising a pneumatic tire rim and an inwardly dished supporting web attached thereto and having means for attachment to a wheel hub, a pneumatic tire on said rim, concentrically disposed radially spaced annular expansion chamber side wall members welded at their inner ends to the outer side of the web and having facing annular channels at their outer ends, the inner side wall member being of such diameter as to afford access to the wheel attaching means, the outer side wall member being adjacent to but spaced from the rim, the outer edge of the rim projecting substantially beyond the outer ends of the wall members to constitute a guard therefor, an annular closure plate disposed between said wall members, snap rings coacting with said channels for retaining said closure plate, an annular plunger-like movable expansion chamber end wall member disposed between said side wall members and provided with packings coacting therewith, said web, side wall members and movable end wall member coacting to provide an expansion chamber, a helically coiled spring arranged between said movable end wall member and said closure member to impart yielding thrust to said end wall member, and a conduit connecting the expansion chamber to the tire, said conduit being mainly disposed between the outer wall member and the rim and being provided with a filling valve, the spring being of such tension as to permit the expansion of the expansion chamber when the pressure within the tire exceeds a predetermined amount and to maintain substantially uniform predetermined pressure within the tire.

2. A wheel comprising a pneumatic tire rim and an inwardly dished supporting web attached thereto and having means for attachment to a wheel hub, a pneumatic tire on said rim, concentrically disposed radially spaced annular expansion chamber side wall members fixed at their inner ends to the outer side of the web, the inner side wall member being of such diameter as to afford access to the wheel attaching means, the outer side wall member being adjacent to but spaced from the rim, an annular closure plate disposed between said wall members, an annular plunger-like movable expansion chamber end wall member disposed between said side wall members and provided with packings coacting therewith, said web, side wall members and movable end wall member coacting to provide an expansion chamber, a spring arranged between said movable end wall member and said closure member to impart yielding thrust to said end wall member, and a conduit connecting the expansion chamber to the tire, the spring being of such tension as to permit the expansion of the expansion chamber when the pressure within the tire exceeds a predetermined amount and to maintain substantially uniform predetermined pressure within the tire.

3. A wheel comprising a pneumatic rim and a supporting web, a pneumatic tire on said rim, concentrically disposed radially spaced annular expansion chamber wall members secured at their inner ends to the web and coacting therewith to provide an annular cylinder, said wall members having facing annular channels at their outer ends, an annular closure plate disposed between said wall members, snap rings coacting with said channels for retaining said closure plate, an annular plunger disposed in said cylinder and coacting therewith to provide an expansion chamber, a coiled spring arranged between said plunger and closure member to impart yielding thrust to the plunger, and a conduit connecting the expansion chamber to the tire, the spring being of such tension as to permit expansion of the expansion chamber when the pressure of the tire exceeds a predetermined amount and to maintain substantially uniform predetermined pressure within the tire.

4. A wheel comprising a rim and a supporting web secured to said rib and extending radially inwardly therefrom, a pneumatic tire on said rim, concentrically disposed radially spaced annular expansion chamber wall members secured at their inner ends to the web and coacting therewith to provide an annular cylinder, an annular plunger disposed in said cylinder and coacting therewith to provide an expansion chamber, a coiled spring having a thrust support with the outer ends of said wall members and acting on said plunger to impart yielding thrust thereto, and a conduit connecting the expansion chamber to the tire, the spring being of such tension as to permit expansion of the expansion chamber when the pressure of the tire exceeds a predetermined amount and to maintain substantially uniform predetermined pressure within the tire.

5. A wheel comprising a pneumatic tire rim, and a supporting web, a pneumatic tire on said rim, the web being connected to the rim adjacent the inner edge thereof to provide a housing space within the rim, an annular expansion cylinder mounted on the web, the inner wall of the cylinder being of such diameter as to permit access to the hub housing means of the wheel, the outer wall of the cylinder being adjacent to but spaced from the rim, the outer edge of the rim projecting beyond the outer ends of the cylinder walls, an annular closure plate for the outer end of the cylinder, an annular plunger within said cylinder, a coiled spring arranged between said plunger and said closure plate to impart yielding thrust to said plunger, and a conduit connecting the expansion chamber to the tire disposed between the outer wall of the cylinder and the rim and provided with a filling valve.

6. A wheel comprising a pneumatic tire rim, and a supporting web, a pneumatic tire on said rim, the web being connected to the rim adjacent the inner edge thereof to provide a housing space within the rim, an annular expansion cylinder mounted on the web, an annular plunger within said cylinder, a spring arranged within said cylinder walls to impart yielding thrust to said plunger, and a conduit connecting the expansion chamber to the tire.

EDWIN R. SAGE.

REFERENCES CITED

The following references are of record in the file of this patent:

UNITED STATES PATENTS

| Number | Name | Date |
| --- | --- | --- |
| 1,016,558 | Garrison | Feb. 6, 1912 |
| 1,035,207 | Libby | Aug. 13, 1912 |